United States Patent Office 3,340,231
Patented Sept. 5, 1967

3,340,231
POLYMERIC COMPOSITIONS RESISTANT TO ULTRAVIOLET LIGHT
Joseph Fertig and Martin Skoultchi, New York, N.Y., and Albert I. Goldberg, Berkeley Heights, N.J., assignors to National Starch and Chemical Corporation, New York, N.Y., a corporation of Delaware
No Drawing. Filed Oct. 28, 1964, Ser. No. 407,236
The portion of the term of the patent subsequent to Dec. 22, 1981, has been disclaimed
9 Claims. (Cl. 260—47)

This invention relates to polymeric compositions and to the process for their preparation, and more particularly to homopolymers displaying unusual resistance to the degradative effects of ultra-violet radiation.

This application is a continuation-in-part of our copending application Ser. No. 213,577, filed July 31, 1962, and now Patent No. 3,173,893.

It is the prime object of this invention to provide polymeric compositions derived from monomeric materials whose presence imparts vastly improved light stability to the resulting polymers.

The incorporation of ultra-violet light absorbers in the synthetic plastics derived from high polymers is, of course, a practice well known to those skilled in the art. Such ultra-violet absorbers are required since outdoor exposure to natural sunlight or continuous indoor exposure to flurescent light tends to degrade most plastics and this photodegradation of plastics is, in turn, known to be caused by the ultra-violet portion of light. Such degradation is observable in a plastic as a change in color, such as a yellowing or darkening, and/or by a deterioration of its physical properties, such as its flexural strength and elongation. In an attempt to overcome these deleterious effects of ultra-violet radiation, the addition of ultra-violet absorbers or stabilizers, such as the phenyl salicyclates or the ortho-hydroxy benzophenones, has of late become of considerable commercial interest. In order to be effective, such materials should be able to absorb strongly in the ultra-violet range of from 300–400 millimicrons without undergoing any change in structure. In addition, they must possess many other properties such as low color, good compatibility, heat stability, low odor, low volatility, chemical stability and chemical inertness. Furthermore a complete lack of toxicity as well as the total absence of any migration from the formulated polymer are two important prerequisites of any ultra-violet stabilizers which are to be used in plastics or coatings which are to be employed as wrappers or containers for food products.

The ortho-hydroxybenzophenones such as 2,4-dihydroxybenzophenone and 2,2',4-trihydroxybenzophenone, have many advantages as ultra-violet absorbers. They are slightly yellow in color and moderately to highly effective, particularly in the range of about 380 millimicrons or higher. However, their compatibility varies depending upon the specific benzophenone compound and the plastic with which they are used.

In our copending applications Ser. No. 202,983, and now Patent No. 3,162,676, and Ser. No. 202,984, and now abandoned, both filed June 18, 1962, and assigned to the assignee of the present application, there are disclosed two novel classes of vinyl type monomers comprising ethylenically unsaturated derivatives of 2,4-dihydroxybenzophenone; 2,2'4-trihydroxybenzophenone; and 2,2',4,4'-tetrahydroxybenzophenone. These derivatives will, for purposes of brevity hereinafter be referred to as the ethylenically unsaturated derivatives of 2,4-dihydroxybenzophenone, since they can, in fact, all be considered as derivatives of this particular ortho-hydroxybenzophenone compound.

These novel derivatives may be utilized in a variety of other applications.

For example, it has been found that since these monomeric benzophenone derivatives were themselves highly compatible with a large number of polymers, they could be utilized, per se, as ultraviolet stabilizing additives for such polymers merely by being physically blended, therewith, without the need for their first being polmerized. The monomeric benzophenone derivatives would thus be employed with such compatible polymers as so called "post-polymerization" additives which would be admixed with a polymer subsequent to its polymerization.

In addition to the above noted use as ultra-violet stabilizing additives, these benzophenone monomers can also be employed as organic intermediates for an unusually wide variety of reactions. A representative, but by no means complete, list of such reactions includes: (A) Reactions of the acrylate double bond such, for example, as the addition of halogens to yield dihalides; the addition of Michael reagents such as sodium bisulfite and thiols; and epoxidation to yield epoxides. (B) Reactions with the secondary hydroxyl group which is present on the substituent side chain such, for example, as the formation of esters by reactions with acid anhydrides or acid chlorides; the conversion of the hydroxyl group to a halide group by reaction with reagents such as $PCl_5$, $PBr_5$, $SOCl_2$, and $SOBr_2$, etc.; and reactions with epoxides, such as ethylene oxide, to yield polyethylene oxides having benzophenone end groups. (C) Reactions on the phenyl rings of the benzophenone nucleus such, for example, as halogenation, nitration, sulfonation, acylation and alyklation reactions; and, azo dye formation by reactions with diazonium salts.

Thus, since the homopolymers which are derived from these novel benzophenone monomers are effective stabilizers, per se, against ultra-violet radiation, they may be converted into form such as films, coatings, and other solid shapes which will exhibit excellent resistance to the degradative effects of ultra-violet radiation. Or, if desired, they may be physically blended with various conventional polymers so that the products prepared from such mixtures will be protected from ultra-violet radiation by the presence, therein, of these novel homopolymers.

The novel polymeric compositions of our invention are thus found to possess all of the many advantages, and particularly the improved light stability, which results from the utilization of extraneous ultra-violet light absorbers while managing to avoid all of the problems which are normally associated with their use. This improved light stability is imparted to these polymers as a result of the presence therein of the hydroxybenzophenone moiety which is permanently bound into and inherently part of the polymer molecules.

The products of our invention may thus be said to comprise those homopolymers derived from at least one ethylenically unsaturated 2,4-dihydroxybenzophenone derivative corresponding to the formula:

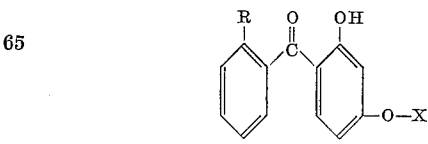

wherein X represents an ethylenically unsaturated group selected from the class consisting of the beta-hydroxypropyl acrylate, i.e.

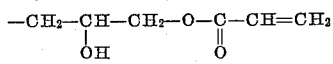

beta-hydroxylpropyl methacrylate, i.e.

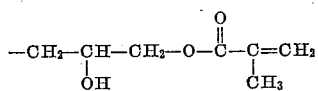

(3-allyloxy-2-hydroxy)propyl, i.e.

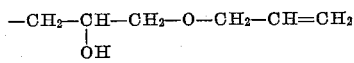

and, (2-hydroxy) butenyl-1, i.e.

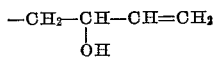

radicals and wherein R represents a radical selected from the class consisting of hydrogen and hydroxy radicals.

As representative of the above described monomers containing the 2,4-dihydroxybenzophenone moiety, one may list the 4-acryloxy beta-hydroxypropyl ether of 2,4-dihydroxybenzophenone; the 4-methacryloxy beta-hydroxypropyl ether of 2,4-dihydroxybenzophenone; the 4-acryloxy beta-hydroxypropyl ether of 2,2',4-trihydroxybenzophenone; the 4-methacryloxy beta-hydroxypropyl ether of 2,2',4-trihydroxybenzophenone; the 4-(2-hydroxy)butenyl-1 ether of 2,4-dihydroxybenzophenone; the 4-(2-hydroxy)butenyl-1 ether of 2,2',4-trihydroxybenzophenone; the 4-(3-allyloxy-2-hydroxy)propyl ether of 2,4-dihydroxybenzophenone; and the 4-(3-allyloxy-2-hydroxy)propyl ether of 2,2',4-trihydroxybenzophenone.

Thus, it is to be seen that the monomers which are essential for the preparation of the polymeric compositions of our invention may be described as monofunctional ethylenically unsaturated derivatives of 2,4-dihydroxybenzophenone; or, more specifically as the mono- beta-hydroxypropyl acrylate, the mono- beta-hydroxypropyl methacrylate, the mono- (2-hydroxy) butenyl-1, and, the mono- (3-allyloxy-2-hydroxy) propyl ethers of 2,4-dihydroxybenzophenone wherein the latter substituent radicals are substituted upon the 4 position of the benzophenone nucleus. As noted earlier, these derivatives will, for purposes of brevity, be referred to as the ethylenically unsaturated derivatives of 2,4-dihydroxybenzophenone, since they can, in fact, all be considered as derivatives of this particular ortho-hydroxybenzophenone compound.

As for the actual preparation of the homopolymers of our invention, they may be prepared by means of any of the usual vinyl polymerization methods which are well known to those skilled in the art. Thus, they may be prepared by means of free radical initiated processes utilizing bulk, suspension, solution or emulsion polymerization techniques; or, they may be prepared by ionic catalysis or by means of stereospecific catalysts such as those of the type developed by Ziegler.

In any event, the homopolymers of our invention, whether prepared by means of bulk, suspension, solution or emulsion polymerization techniques, or by other means, are all characterized by the improved stability to ultraviolet radiation which they impart to a wide variety of polymeric subtrates. Thus, our novel polymeric compositions offer protection against the degradative effects of ultra-violet radiation while eliminating problems of volatility, toxicity or migration which occur when extraneous

| Identifying Letter | Structure | Name |
|---|---|---|
| A | | The 4-acryloxy beta-hydroxypropyl ether of 2,4-dihydroxybenzophenone. |
| AA | | The 4-methacryloxy beta-hydroxypropyl ether of 2,4-dihydroxybenzophenone. |
| B | | The 4-acryloxy beta-hydroxypropyl ether of 2,2',4-trihydroxybenzophenone. |
| C | | The 4-(3-allyloxy-2-hydroxy)propyl ether of 2,4-dihydroxybenzophenone. |
| D | | The 4-(2-hydroxy)butenyl-1 ether of 2,4-dihydroxybenzophenone. | additives are utilized for the ultra-violet stabilization of polymeric materials.

There are several different techniques by means of which the homopolymers of our invention may be utilized. Thus, where possible, they may be directly fabricated into such forms as coatings, films, sheeting and other solid shapes which may then be further fabricated into various industrial and consumer articles. On the other hand, our products may also be physically blended with a wide variety of polymers and these blends may then be used as desired. For example, where the resulting homopolymer is compatible with a conventional polymer, it may be advantageous to physically blend the two polymers so as to yield a polymeric mixture which is resistant to the degradative effects of ultra-violet radiation. Examples of such blends would be a mixture of polypropylene with the homopolymer of the 4-methacryloxy beta-hydroxypropyl ether of 2,4-dihydroxybenzophenone or a mixture of a vinylidene chloride polymer with the homopolymer of the 4-acryloxy beta-hydroxypropyl ether of 2,4-dihydroxybenzophenone. In addition, our homopolymers may, if compatible, be directly blended with cellulosics and thereby impart the advantages of the compositions of our invention to these materials.

The following examples will more clearly illustrate the embodiments of our invention. In these examples, all parts given are by weight unless otherwise noted.

Above are given the names and structures of the ethylenically unsaturated benzophenone derivatives which were used in preparing the various homopolymers described in the following examples. For purposes of brevity, these monomers will hereinafter be referred to by means of the identifying letters which precede the name of each monomer.

EXAMPLE I.—This example illustrates the preparation of one of the novel homopolymers of our invention by means of a solution polymerization technique and also demonstrates how use is made of the inherent resistance towards the degradative effects of ultra-violet radiation which is displayed by the films derived from the resulting lacquer.

An ethyl acetate lacquer of the homopolymer of monomer A was prepared by charging the following ingredients into a reactor equipped with a reflux condenser as well as with means for mechanical agitation.

|  | Parts |
| --- | --- |
| Monomer A | 100.0 |
| Tetrahydrofuran | 200.0 |
| Benzoyl peroxide | 0.5 |

Under agitation, the above mixture was then refluxed at 78° C. for a period of 8 hours whereupon it was allowed to cool and discharged from the reactor. The resulting lacquer had a resin solids content of 30.0%, by weight, indicating a conversion of 100%.

The above described homopolymer lacquer was diluted, by the addition of ethyl acetate, to a solids content of 5%, by weight. A film having a wet thickness of 3 mils, was then cast from this lacquer onto the surface of a 1.5 mil, dry thickness film of a 90:10 vinylidene chloride: ethyl acrylate copolymer. The resulting laminate was then exposed to the equivalent of 14 hours of direct sunlight by being placed, at a distance of two feet, from a mercury vapor photochemical lamp which was enclosed, together with the laminate, in a ventilated, light proof cabinet for a period of one hour.

The effect of this light source upon this laminate was determined, with respect to any color change which had occurred, by utilizing a Photovolt Reflectometer, Model No. 610; the latter being a device which records proportionately higher readings with the increasing yellowing, or other discoloration, of the particular coatings being evaluated.

As a control for this test, a 1.5 mil, dry thickness, free film of a 90:10 vinylidene chloride:ethyl acrylate copolymer was exposed under the identical conditions.

The following table presents the results of these tests. In this table, the reflectometer readings which are given represent the difference between the readings obtained subsequent to their exposure to the light source. Thus, a higher degree of discoloration will, of course, be indicated by a higher reading.

| No. | Test Section | Equivalent of 14 hours of Sunlight |
| --- | --- | --- |
| Control | Free film of 90:10 vinylidene chloride. ethyl acrylate copolymer. | 35.5 |
| 1 | Laminate of the homopolymer of monomer A over the 90:10 vinylidene chloride. ethyl acrylate film. | 3.0 |

The above results thus serve to demonstrate how films derived from our novel ultra-violet resistant homopolymers may be used to protect other polymers from the effects of ultra-violet degradation.

In a series of repetitions of the above noted solution polymerization procedure, each of monomers AA, B, C and D were, respectively, substituted for monomer A so as to yield homopolymer lacquers whose films displayed properties comparable to those described, hereinabove, for the films derived from the homopolymer of monomer A.

Summarizing, our invention is thus seen to provide a novel class of homopolymers which are characterized by their outstanding resistance to the normally degradative effects of ultra-violet radiation. Variations may be made in proportions, procedures and materials without departing from the scope of this invention as defined by the following claims.

What is claimed is:

1. A composition of matter comprising a homopolymer of an ethylenically unsaturated 2,4-dihydroxybenzophenone derivative selected from the group consisting of:

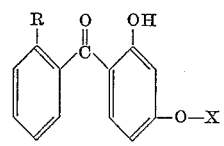

wherein X represents an ethylenically unsaturated group selected from the class consisting of the beta-hydroxypropyl acrylate, beta-hydroxypropyl methacrylate (3-allyloxy-2-hydroxy)propyl, and (2-hydroxy)butenyl-1 radicals; and, wherein R represents a radical selected from the class consisting of hydrogen and hydroxy radicals.

2. A homopolymer of the 4-acryloxy beta-hydroxypropyl ether of 2,4-dihydroxybenzophenone.

3. A homopolymer of the 4-methacryloxy beta-hydroxypropyl ether of 2,4-dihydroxybenzophenone.

4. A homopolymer of the 4-acryloxy beta-hydroxypropyl ether of 2,2',4-trihydroxybenzophenone.

5. A homopolymer of the 4-methacryloxy beta-hydroxypropyl ether of 2,2',4-trihydroxybenzophenone.

6. A homopolymer of the 4-(2-hydroxy)butenyl-1 ether of 2,4-dihydroxybenzophenone.

7. A homopolymer of the 4-(2-hydroxy)butenyl-1 ether of 2,2',4-trihydroxybenzophenone.

8. A homopolymer of the 4-(3-allyloxy-2-hydroxy) propyl ether of 2,4-dihydroxybenzophenone.

9. A homopolymer of the 4-(3-allyloxy-2-hydroxy) propyl ether of 2,2',4-trihydroxybenzophenone.

(References on following page)

References Cited

UNITED STATES PATENTS

| | | | |
|---|---|---|---|
| 2,962,533 | 11/1960 | Hardy et al. | 260—591 |
| 3,162,676 | 12/1964 | Goldberg et al. | 260—63 |
| 3,173,893 | 3/1965 | Fertig et al. | 260—47 |
| 3,202,716 | 8/1965 | Goldberg et al. | 260—47 |

OTHER REFERENCES

Monomers, Interscience Publishers, 1950, "Methyl Methacrylate," page 10; "Styrene," page 10; "Vinyl Acetate," page 20.

WILLIAM H. SHORT, *Primary Examiner*.

C. A. WENDEL, L. P. QUAST, *Assistant Examiners*.